UNITED STATES PATENT OFFICE.

CHARLES RICHTER, OF ST. PAUL, MINNESOTA.

PROCESS OF TAWING AND COLORING HIDES AND SKINS.

SPECIFICATION forming part of Letters Patent No. 260,418, dated July 4, 1882.

Application filed March 8, 1882. (No specimens.)

*To all whom it may concern:*

Be it known that I, CHARLES RICHTER, of St. Paul, in the county of Ramsey and State of Minnesota, have invented a new and useful Process of Tawing and Coloring Hides and Skins, of which the following is a specification.

First prepare a mixture of clay as follows: Fill a barrel or other suitable vessel half-full of clay, (preferably clay suitable for making bricks.) Then add water sufficient to thoroughly reduce the clay, destroying its adhesive qualities and forming a mixture of a thick, semi-liquid condition. Then mix therewith the following ingredients, in substantially the following proportions, viz: To every thirty-two gallons of the clay-and-water mixture add four quarts of common salt, one pint of sulphuric acid, and presently add one quart of brewer's yeast, and thoroughly incorporate them. An effervescence will ensue and continue for about twenty-four hours, and when it ceases the liquid compound will begin to precipitate. Then remove the impurities deposited and leave the supernatant water, and fill the barrel or other vessel with water and dissolve therein six ounces of alum to every thirty-two gallons of liquid, and then place the skins or raw hides in a sufficient quantity of the solution to cover the hides, and keep them covered with it for about three days. A few hours more or less will make no difference. Then take the skins out and dress them in the ordinary manner. This will make fine white leather.

If a colored leather is desired, the hides should be placed in a suitable vessel and covered with a coloring mixture formed of the foling ingredients, in substantially the following proportions, viz: twenty-five gallons of water, two pounds of sulphate of iron, and two pounds of bichromate of potash. Then add one quart of hot water in which has been dissolved one ounce of terra-japonica and one ounce of hemlock, more or less, as color is to be lighter or darker.

When a darker color is required to the clay compound already described, add one pound of hemlock extract and one pound of terra-japonica which have been thoroughly dissolved in hot water. Apply to the skins after being tawed and dressed by pouring the mixture over them when in a close vessel, so as to cover them, and keep about thirty-four hours in this solution.

I have in other patents of even date herewith covered the process for making the clay mixture, and also the coloring compounds, and I do not claim the same specifically in this patent. I have found the coloring mixtures hereinbefore set forth to be especially adapted for coloring hides prepared in the foregoing manner.

What I claim as my invention, and desire to secure by Letters Patent, is—

The mode of tawing and coloring hides and skins by first treating them with a mixture of clay, water, common salt, sulphuric acid, brewer's yeast, and alum, substantially as set forth, and then coloring with a solution of water, sulphate of iron, bichromate of potash, hemlock extract, and terra-japonica, substantially in the manner set forth.

CHARLES RICHTER.

In presence of—
ALVA L. ROE,
ANGIER AMES.